(12) United States Patent
Juppi et al.

(10) Patent No.: US 7,142,869 B2
(45) Date of Patent: Nov. 28, 2006

(54) METHOD OF TRANSMITTING AREA-SPECIFIC INFORMATION ON A TELECOMMUNICATIONS NETWORK

(75) Inventors: Anssi Juppi, Helsinki (FI); Jari Vainikka, Vantaa (FI)

(73) Assignee: Nokia Corporation, Espoo (FI)

( * ) Notice: Subject to any disclaimer, the term of this patent is extended or adjusted under 35 U.S.C. 154(b) by 601 days.

(21) Appl. No.: 10/148,959

(22) PCT Filed: Dec. 4, 2000

(86) PCT No.: PCT/FI00/01070

§ 371 (c)(1),
(2), (4) Date: Oct. 4, 2002

(87) PCT Pub. No.: WO01/43479

PCT Pub. Date: Jun. 14, 2001

(65) Prior Publication Data

US 2003/0092450 A1 May 15, 2003

(30) Foreign Application Priority Data

Dec. 7, 1999 (FI) ................................. 19992621

(51) Int. Cl.
*H04Q 7/20* (2006.01)
*H04M 11/04* (2006.01)
(52) U.S. Cl. ............... 455/456.1; 455/456.3; 455/422.1
(58) Field of Classification Search ........... 455/414.01, 455/414.02, 414.03, 456.1, 456.2, 456.3, 455/422.1, 426.1, 404.2
See application file for complete search history.

(56) References Cited

U.S. PATENT DOCUMENTS

| | | | | |
|---|---|---|---|---|
| 6,104,709 A | * | 8/2000 | Rinchiuso et al. | 370/335 |
| 6,108,533 A | * | 8/2000 | Brohoff | 455/414.3 |
| 6,144,651 A | * | 11/2000 | Rinchiuso et al. | 370/335 |
| 6,275,201 B1 | * | 8/2001 | Kratzenberg et al. | 40/446 |
| 6,334,052 B1 | * | 12/2001 | Nordstrand | 455/411 |
| 6,625,442 B1 | * | 9/2003 | Kojima | 455/414.1 |

FOREIGN PATENT DOCUMENTS

| | | |
|---|---|---|
| EP | 1 043 911 | 10/2000 |
| WO | WO 96/35289 | 11/1996 |
| WO | WO 97/41654 | 11/1997 |
| WO | WO 98/16076 | 4/1998 |
| WO | WO 98/19479 | 5/1998 |
| WO | WO 99/45732 | 9/1999 |
| WO | WO 00/04730 | 1/2000 |
| WO | WO 00/04734 | 1/2000 |
| WO | WO00/28748 | 5/2000 |

OTHER PUBLICATIONS

ETSI, GSM, Digital Cellular Telecommunication System (Phase 2); Technical realization of Short Message Service Cell Broadcast (SMSCB) (GSM 03.41), ETS 300 537, May 1996, Second Edition, 23 pp.

* cited by examiner

*Primary Examiner*—Sonny Trinh
(74) *Attorney, Agent, or Firm*—Pillsbury Winthrop Shaw Pittman LLP

(57) ABSTRACT

A method of transmitting area-specific information on a telecommunications network. The invention comprises at least one element, e.g., a weather probe, which is external to the telecommunications system and transmits local information to the telecommunications system, which independently determines in which at least one node the information should be transmitted and, after the determination, transmits this information to at least one subscriber terminal via at least one node.

16 Claims, 4 Drawing Sheets

FIG. 1
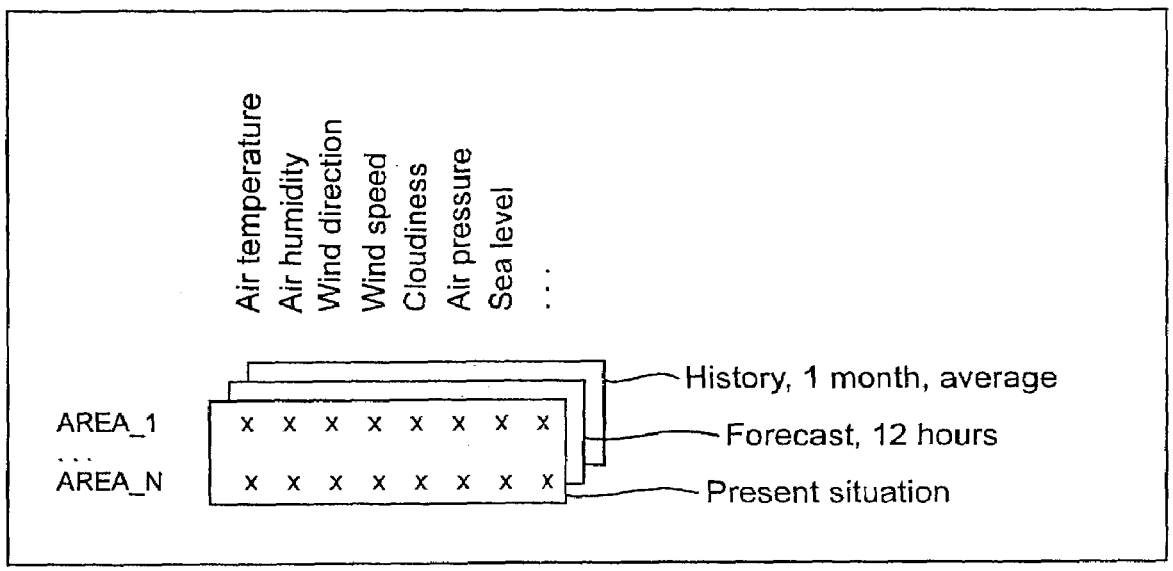
FIG. 2
|  | Air temperature | Air pressure | Current | Forecast1 2h | Forecast 24h |  |
|---|---|---|---|---|---|---|
| Subscriber_1 | x |  |  | x |  | AREA_1 |
| Subscriber_1 |  | x | x |  |  | AREA_1 |
| Subscriber_1 | x |  |  | x |  | AREA_6 |
| Subscriber_1 | x |  |  |  |  | AREA_ACTIVE |
FIG. 3
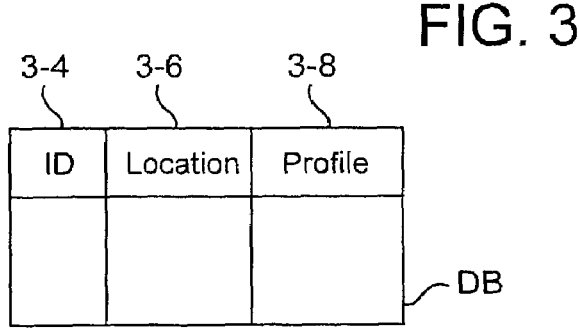

METHOD OF TRANSMITTING AREA-SPECIFIC INFORMATION ON A TELECOMMUNICATIONS NETWORK

This is a National Stage application of International Application No. PCT/FI00/01070, which was filed on Dec. 4, 2000, which designated the U.S., and was filed in the English language.

BACKGROUND OF THE INVENTION

The invention relates to transmission of area-specific information, such as weather information, on a telecommunications network, particularly on a mobile communication network.

In the GSM mobile communication system (Global System for Mobile Communication), FIG. 6, a mobile station MS is connected to a base transceiver station BTS via a radio path. A base station system BSS consists of base station controllers BSC and of base transceiver stations BTS controlled by them. A mobile services switching centre MSC usually controls several base station controllers BSC and communicates with other mobile services switching centres. The GSM network is connected to other networks, such as a public switched telephone network PSTN, another mobile communication network PLMN, an ISDN network or a service centre SC, e.g. a short message service centre SMSC, via a gateway mobile services switching centre GMSC.

One of the new services introduced into the GSM system is GPRS (General Packet Radio Service). Network elements that belong to the GPRS include SGSN (Serving GPRS Support Node), GGSN (Gateway GPRS Support Node) and PTM-SC (Point-to-Multipoint Service Centre). The SGSN maintains and updates location information of mobile stations which support the GPRS. The SGSN also contains protocol stacks for transmitting data packets to the base station system BSS and the mobile station and for receiving data packets from these. The GGSN functions as an interface to other data networks, such as the Internet or an Internet service provider. The PMT-SC transmits data packets to groups of mobile stations supporting the GPRS.

In the mobile communication system, the base transceiver stations BTS continuously transmit information on themselves and their surroundings on their broadcast channel. For example, the cell broadcast centre CBC located in the base station controller BSC manages messages of the cell broadcast channels of the base transceiver stations BTS. The cell broadcast centre transmits group transmission messages directed to each base transceiver station via the base station controller BSC according to the initial data fed in by the operator.

Group transmission of the base transceiver stations is not addressed to any particular receiver, but intended to be received by all mobile stations located in the geographic area covered by the transmission of the base transceiver station. As regards a more specific description of cell-specific group transmission, reference is made to GSM recommendation 03.41 *European Digital Cellular Telecommunication System (Phase 2); Technical Realization of Short Message Service Cell Broadcast (SMSCB)*.

In the mobile communication system it is possible to transmit various service announcements to mobile stations. A service announcement may be e.g. a weather forecast for a certain region, which a mobile subscriber can order on the basis of his geographic location. There are, however, problems related to ordering of an area-specific announcement: it is inaccurate and slow. The area covered by one weather forecast is usually large, and thus the information ordered is inaccurate. Furthermore, the selection lists of areas are long, and thus the mobile subscriber has to go through several weather forecast areas when making his choice.

It has been suggested that the above-mentioned problems be solved by distributing area-specific information directly to the mobile stations that are in a certain area and have ordered the service. According to WO publication 98/19479 Location-Dependent Services in a Mobile Communication System, a base transceiver station transmits location information on its cell broadcast channel, a mobile station picks this location information from a group transmission and stores it. When a subscriber wants to receive a service announcement dependent on the geographic area, he initiates establishment of a short message in his mobile station, and the location information concerned is attached to the short message. A short message thus formed is transmitted to the unit that offers the service, and the unit sends the requested service announcement to the mobile station that ordered the service e.g. as a short message or as data transmission. The problem associated with this solution of the WO publication is that reception of location information and manual ordering of information cause a delay.

BRIEF DESCRIPTION OF THE INVENTION

An object of the invention is to provide a method and an apparatus implementing the method to solve the above-mentioned problem, i.e. the delay caused by reception of location information and manual ordering of information. The objects of the invention are achieved with a method and an apparatus which are characterized by what is disclosed in the independent claim. The preferred embodiments of the invention are described in the dependent claims.

The invention is based on dividing the area covered by a telecommunications network into a number of sub-areas to transmit information to a number of subscribers of the telecommunications network via network nodes. The invention also comprises maintaining:

1) information indicating on which sub-areas said subscribers have ordered information, e.g. on the air quality;

2) information indicating the sub-area to which the subscriber terminals of said subscribers are connected at a given time;

3) information indicating the correspondence between each node and each sub-area.

The above-mentioned information is used for determining via which nodes the sub-area specific information is to be transmitted.

According to a preferred embodiment of the invention an element, i.e. a local transmitter LT, is connected or attached to the telecommunications system for transmitting local information to the telecommunications system;

utilizing the above-mentioned information, which is stored e.g. in a database, the telecommunications system determines in which at least one node the information should be transmitted to a group; and the telecommunications system transmits the information to a group via said at least one node. Thanks to group transmission, the same transmission can be utilized by several subscriber terminals.

By means of a database the transmission can be directed to certain receivers as accurately as necessary and transmission of unnecessary information and use of network resources can be minimized. An advantage of the invention is that by means of the database local information can be transmitted fast and accurately to the relevant subscriber terminals, e.g. to mobile stations. A further advantage of the invention is that the user of area-specific information receives this information quickly as his location changes.

BRIEF DESCRIPTION OF THE DRAWINGS

The invention will be described in greater detail by means of preferred embodiments with reference to the accompanying drawings, in which FIG. 1 illustrates information that can be ordered;

FIG. 2 illustrates a subscriber profile;

FIG. 3 illustrates a subscriber database;

DETAILED DESCRIPTION OF THE INVENTION

According to the invention, information is transmitted to subscriber terminals on a telecommunications network. In this example it is assumed that this information is weather information. According to FIG. 1, it may include air temperature and humidity, wind direction, wind speed, cloudiness, air pressure, sea level or a combination thereof. The information to be ordered may be substantially current information and/or a forecast for the situation after 12 or 24 hours, for example, and/or history information on the average temperature of the preceding month, for example. Information can also be ordered from various areas AREA_1 to AREA_N or from a large geographic area. In other words, FIG. 1 illustrates the information that can be ordered by subscribers.

FIG. 2 illustrates a subscriber profile, i.e. what kind of weather information SUBSCRIBER_1 has ordered. As is seen in the figure, the subscriber has ordered a forecast for the temperature of area 1 after 12 hours as well as information on the current air pressure in the area in question. He has also ordered information on the current temperature in area 6 and temperature information on the area AREA_ACTIVE in which he is at a given time.

FIG. 3 illustrates a subscriber database (DB). The figure shows only the parts of the database that are relevant to the invention. In the subscriber database DB subscriber profiles are inserted into column 3–8, subscriber location into column 3–6 and the identification data of subscribers into column 3–4. In other words, the database comprises order-based information indicating to which mobile station the information is to be transmitted.

The database of FIG. 3 and/or an entity of it, e.g. the subscriber profile information, i.e. subscriber profile file, may be centralized or de-centralized. The database and/or the file or part of them may be located at the premises of the service provider who produces the information or who transmits the information, e.g. at a regional alarm receiving centre or at the premises of road service, and the rest of the files included in the database may be located in a separate network element in the cell broadcast centre CBC or PTM-SC.

Figure 4:
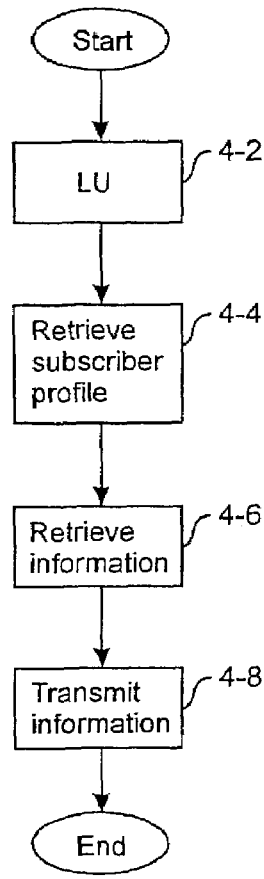
FIG. 4 is a flow chart illustrating how the network defines the cells via which information is to be transmitted.

FIG. 4 is a flow chart according to a preferred embodiment of the invention, which illustrates how the network defines the cells via which the information ordered by subscribers is transmitted to them. In step 4-2 the database DB receives an input from the network e.g. in connection with the location update LU of a subscriber terminal, such as a mobile station. The input may also be a short message or a GPRS packet. The input provides the identity of the mobile station MS and location information. In step 4-4 it is checked in the subscriber profiles what kind of information each subscriber has ordered. The database DB may also be provided with a filtering facility, and thus some of the information available (temperature, wind, humidity, etc.) can be filtered out before the information is transmitted to the subscriber, even if the subscriber had asked for this information.

In step 4-6 the information according to the subscriber profiles is retrieved from the database DB, and in step 4-8 information is transmitted to the subscriber who has ordered it according to the prior art via the telecommunications network.

Figure 5:
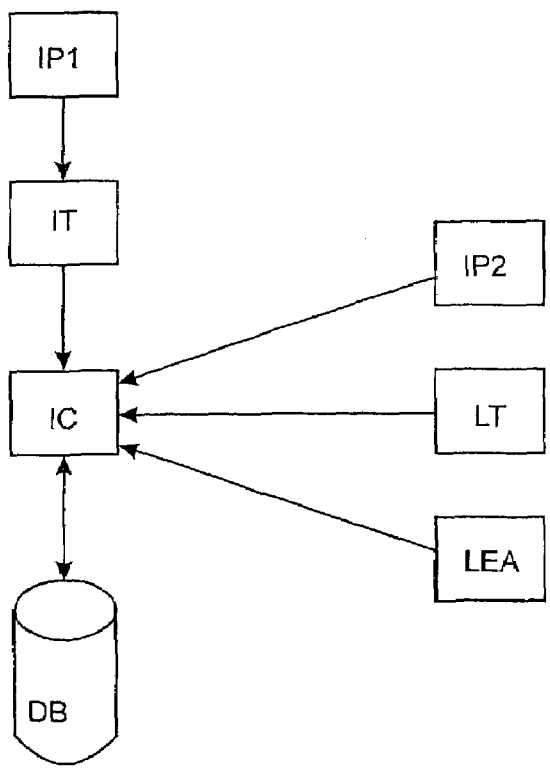
FIG. 5 illustrates a system for storing information in a subscriber database.
Figure 6:
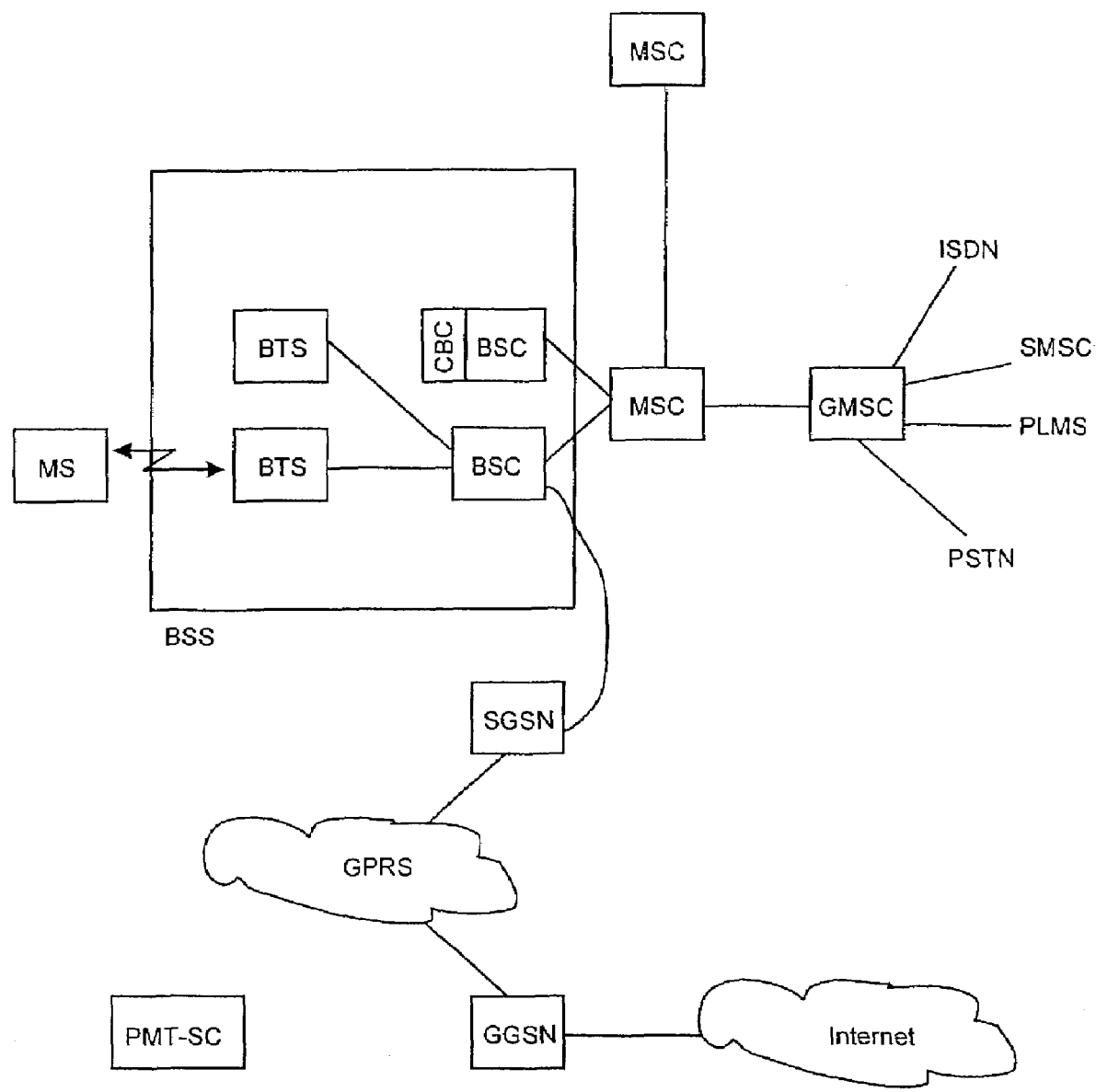
FIG. 6 illustrates a prior art GSM mobile communication system.

FIG. 5 illustrates a system for storing information in a database DB. The information that can be stored/updated in the database includes information measured by a local transmitter LT, information transmitted to an information transmitter IT by an information provider IP1 or information produced by the information provider IP2. Storing/updating of information can be performed e.g. as follows: the element that produces or transmits information sends its information to an information communicator IC, which can store/update the information in the database DB. Update of information may be continuous, performed every now and then, or information can be updated only when a subscriber or an operator requests it. The system may also comprise an element LEA (Law Enforcement Authority) which may give instructions on what kind of information may be transmitted to subscribers.

In practice, the information of one local transmitter can be divided into several cells, to which information is transmitted at the same time. Distribution of information to different cells, and mobile stations is based on the above-mentioned database, which is used for determining to which cells or mobile stations the information should be transmitted. Thus the information received from the local transmitter does not contain information on the cells to which the information should be forwarded. Supply of information may also be conditional, i.e. if a certain mobile station is within a certain area, information will be transmitted to it. Transmission can also be performed by means of an external input.

If it is desirable that information should not be available for all subscribers, it can be encrypted. The encrypted information can be transmitted via telecommunications networks, but only the subscribers who have hired a decryption key e.g. from the operator are entitled to read the information.

Figure 7:
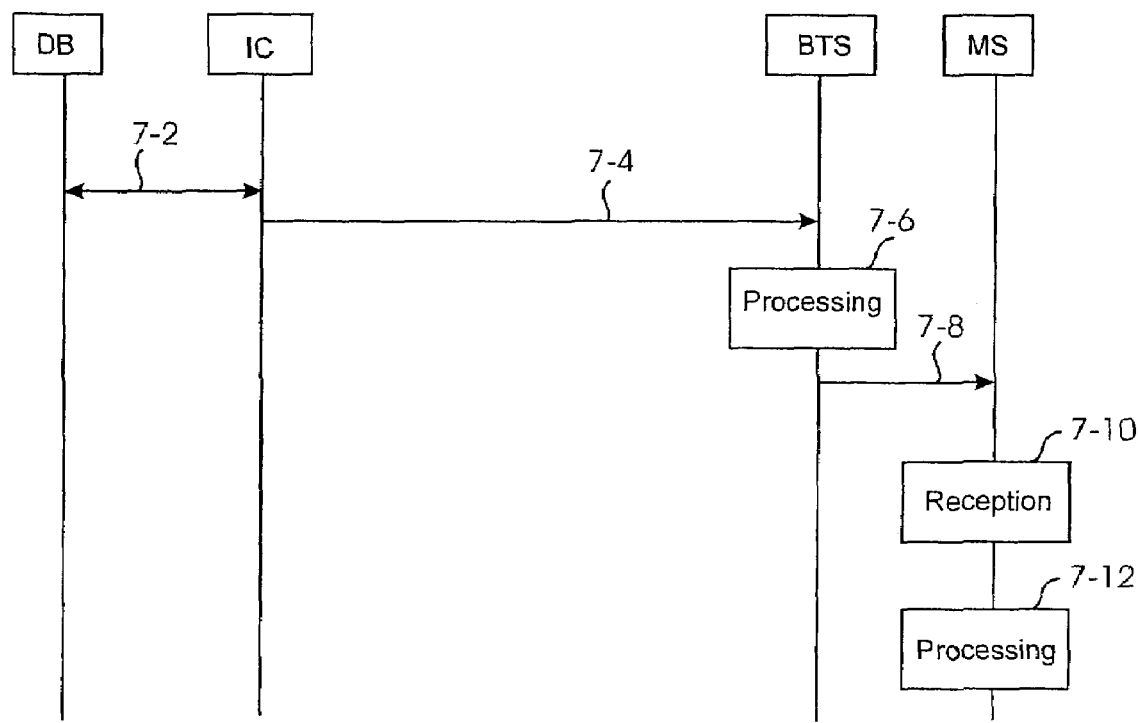
FIGS. 7 and 8 illustrate two alternative embodiments for transmitting information to a subscriber.

FIG. 7 is a signalling chart illustrating transmission of information from the database DB of a service provider to the subscriber MS who has ordered information. Before the data transmission, the local transmitter LT, for example, may have sent local information, i.e. measurement results, to the GSM network for processing and storing. The local transmitter, i.e. an external element of the mobile communication system, may be a weather probe, sensor or a similar measurement or telemetry device which measures different variables and transmits measurement results. The information sent by the local transmitter LT can be supplied to the information communicator IC, for example.

The communicator receives information and processes it further. The information can be stored in a database DB, for instance. After this, the location update of the subscriber, for example, triggers retrieval of the information according to the subscriber profile from the database DB (FIG. 3), and the telecommunications network performs steps 4-4 and 4-6 (FIG. 4) as described above. In step 7-2 the communicator IC retrieves information from the database DB and transmits the information to be sent to a base transceiver station in step 7-4.

In step 7-6 the base transceiver station BTS receives the information transmitted by the communicator IC, and in step 7-8 the base transceiver station BTS transmits processed local information to the mobile station. In step 7-10 the mobile station receives the local information transmitted by the network and converts it into a format understood by the user in step 7-12. If the mobile communication network, the mobile station and/or the subscriber identification unit, e.g. SIM (Subscriber Identity Module), are provided with an application necessary for processing local information, the information can be processed/converted into different maps or diagrams, for example.

In the embodiment of FIG. 7 the group transmission to mobile stations occurs only via the above-mentioned base transceiver station BTS, i.e. the service is transmitted only to one cell at a time. If the service is to be transmitted to more than one cell using the embodiment of FIG. 7, the service has to be transmitted further in the GSM network. Advantages of the embodiment shown in FIG. 7 include low signalling load, which is restricted to the base transceiver station, and low transmission costs, i.e. no new connections are needed between the network elements.

Instead of the embodiment illustrated in FIG. 7, the information transmitted by the communicator IC can be transmitted to a base transceiver station via the base station controller BSC. In that case the communicator IC transmits local information to the base station controller in a standardized format of the XTI interface (X-open Transport Interface), e.g. by means of the X.25 or Ethernet protocol. The base transceiver controller receives the transmission by the communicator IC and, if necessary, processes it, and transmits, i.e. supplies, a weather information signal to the broadcast channel. After this, the base transceiver station BTS receives, processes and transmits information only to a one cell at a time as described above in connection with the embodiment of FIG. 7.

Figure 8:
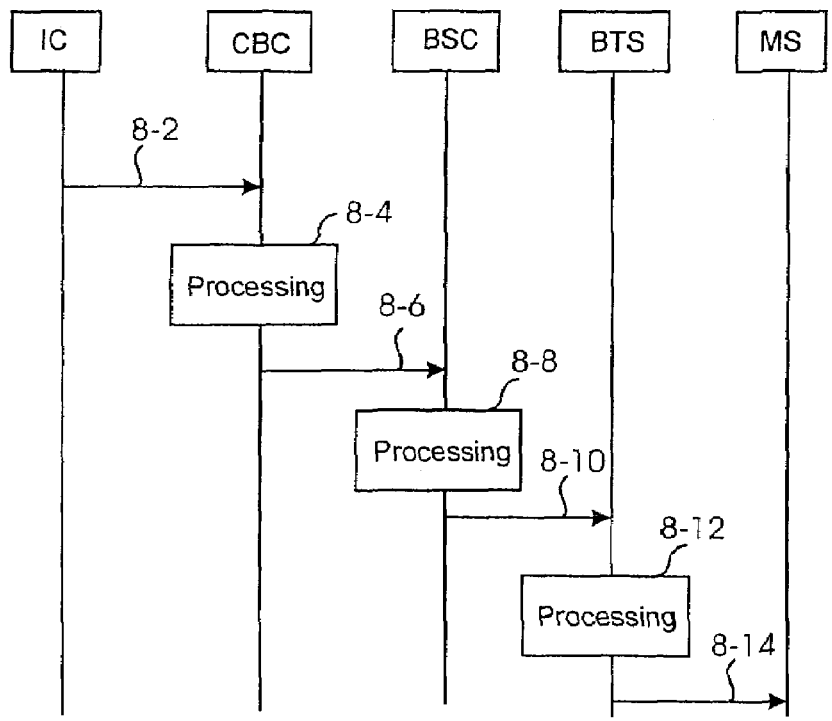

If the service is to be available in more than one cell, the communicator IC can signal directly to the cell broadcast centre CBC of the cell using a protocol in accordance with the XTI interface. The CBC may contain part of the database or the whole database as well as the applications which determine where information is to be sent. The transmission occurs on the cell broadcast channel of the logical channel at the cell's air interface. The cell broadcast centre CBC transmits control information indicating to which cell the information is to be sent, and the actual information. This is illustrated in FIG. 8. The cell broadcast centre CBC may alternatively be replaced with a PTM-SC, which has substantially the same properties as the cell broadcast centre CBC. The database does not need to be located in the cell broadcast centre CBC, either, but it can be a separate network element which makes a service request to the cell broadcast centre CBC or PTM-SC.

In FIG. 8 the CBC receives information from the communicator IC in step 8-2. The CBC may process the local information received from the communicator IC in step 8-4 and then transmit it normally in step 8-6 in the XTI format via the cells of the base station controller BSC for group transmission. In step 8-8 the BSC receives the information transmitted by the cell broadcast centre CBC, and in step 8-10 the BSC activates the CBC/SMS service for different base transceiver stations BTS on the basis of the control of the cell broadcast centre CBC, i.e. the BSC controls the weather information signal as a CBC/SMS service on certain broadcast channels. In step 8-12 the base transceiver station receives information and processes it further, and it transmits the information to at least one mobile station in step 8-14.

Instead of the direct signalling from the communicator IC to the cell broadcast centre CBC shown in FIG. 8, it is possible to use a short message service centre SMSC, which transmits local information to the short message service centre of a cell as a normal short message. The function of the short message service centre SMSC is to receive short messages and to convert them into the TCP/IP format, if necessary, and to forward them. Information is transmitted to the cell broadcast centre e.g. as a short message or in accordance with the TCP/IP protocol. In the following step the cell broadcast centre CBC receives the transmission of the short message service centre SMSC and analyses the local information included in it. After this, the CBC transmits local information to base station controllers in a format according to the XTI protocol. The cell broadcast centre CBC also comprises the database described above and applications which determine where or to whom information is to be transmitted. After this, information travels to a mobile station MS as described in connection with the embodiment of FIG. 7.

The above-mentioned embodiment provides several advantages in the transmission of local information. Software changes are needed only in the network element that processes the short message received from the local transmitter. Furthermore, transmission costs are low, information needs to be processed only in the cell broadcast centre CBC and information is available in an area consisting of more than one cell.

Signalling from the local transmitter LT to the mobile communication system can also be implemented as follows: a local transmitter LT, into which an external transmitter has been integrated, transmits local information to the cell broadcast centre CBC along a link which is independent of the telecommunications system GSM, i.e. using a transmission system external to the telecommunications system GSM, and the cell broadcast centre CBC, which includes a receiver for receiving a message arriving along a link independent of the telecommunications system GSM, receives the information transmitted by the local transmitter LT.

Signalling can also be implemented by transmitting local information as GPRS packets (General Package Radio System). A local transmitter LT, into which a transmitter capable of transmitting GPRS packets has been integrated, transmits information in the TCP/IP format via the GGSN and the Internet to the cell broadcast centre CBC. The CBC processes the information and transmits it in accordance with the XTI protocol to the base station controller BSC, which in accordance with Abis signalling forwards the information the base transceiver station BTS. The BTS receives packets on the channel assigned to it and transmits the packets to a mobile station either as a GPRS packet or as a CBC/SMS service.

Even though the, embodiments described above illustrate transmission of information from the local transmitter LT to the GSM network and up to the mobile station, the mobile station can also transmit information in the other direction.

A request for weather information on a certain area can be made from a mobile station e.g. as a short message SM, GPRS service or by calling to a certain number. The function of the local transmitter LT can also be controlled by transmitting different inputs to the local transmitter LT.

In addition to the information on the weather and air quality, the above-mentioned embodiments are also applicable to transmission of any local information, e.g. to transmission of traffic information. If the database is made more complicated, local information can be transmitted to a certain subscriber group according to their special needs. The service may be subscribable, chargeable, free of charge or a non-profit service. The service can be transmitted recurrently, e.g. at certain intervals. It typically takes a few seconds to transmit a service from the local transmitter LT to a mobile device.

It is obvious to a person skilled in the art that as technology advances, the inventive concept can be implemented in various ways. The invention and its embodiments can be implemented e.g. in a network which supports the Mobile IP (Internet Protocol) protocol, by means of which telecommunications properties of the Internet network can be offered to a mobile user without the user having to change her IP address. When the subscriber arrives in a new area the access point of which is not included in his home location point, the requested information can still be transmitted to him. The invention and its embodiments are thus not limited to the examples described above, but may vary within the scope of the claims.

The invention claimed is:

1. A method of transmitting information to a number of subscribers of a telecommunications network, each of whom have a subscriber terminal, which is connected to at least one node of the telecommunications network, comprising:
   dividing the area covered by the telecommunications network into a number of sub-areas;
   maintaining information indicating on which sub-areas the subscribers have ordered information;
   maintaining information indicating to which sub-area the subscriber terminals of said subscribers are connected at a given time;
   maintaining information indicating the correspondence between each node and each sub-area;
   determining on the basis of said information via which nodes said sub-area-specific information is to be transmitted; and
   transmitting, in response to a triggering event, sub-area-specific information to the subscribers via nodes of the telecommunications network.

2. A method according to claim 1, wherein the telecommunications network is a mobile communication network, and the nodes are network elements which define cells of the coverage area of a base station.

3. A method according to claim 1, wherein the sub-area-specific information is produced by several local transmitters, and wherein a database indicates the local transmitter in the area of which the subscribers are.

4. A method according to claim 1, wherein the sub-area-specific information includes information of different kinds, and wherein said database also contains information on the type of information said subscribers have ordered.

5. A method according to claim 1, wherein the sub-area-specific information includes information related to several time periods and said database also contains information on the period on which said subscribers has ordered information.

6. A method according to claim 1 or 2, wherein the information is transmitted on a broadcast channel.

7. A method according to claim 1 or 2, wherein the information is transmitted as a group transmission.

8. A method according to claim 1 or 2, wherein the information is transmitted using a Mobile IP protocol.

9. The method of claim 1, wherein the triggering event is a location update.

10. An apparatus for transmitting information to a number of subscribers of a telecommunications network, each of whom have a subscriber terminal, which is connected to at least one node of the telecommunications network, the area covered by the telecommunications network being divided into a number of sub-areas, the apparatus comprising:
    a storage mechanism configured to maintain information indicating on which sub-areas the subscribers have ordered information, said information being sub-area-specific information;
    a storage mechanism configured to maintain information indicating to which sub-area the subscriber terminals of said subscribers are connected at a given time;
    a storage mechanism configured to maintain information indicating the correspondence between each node and each sub-area;
    a processor configured to determine on the basis of said information via which nodes said sub-area-specific information is to be transmitted; and
    a transmitter configured to transmit, in response to a triggering event, sub-area specific information via nodes of the telecommunications system.

11. An apparatus according to claim 10, wherein the apparatus is located in a mobile communication system.

12. An apparatus according to claim 11, wherein the apparatus is located in a home location register.

13. A method according to claim 11, wherein the apparatus is located in a visitor location register.

14. The apparatus of claim 10, wherein the triggering event is a location update.

15. The apparatus of claim 10, wherein the triggering event is a location update.

16. An apparatus for transmitting information to a number of subscribers of a telecommunications network, the apparatus comprising:
    means for transmitting information via nodes of the telecommunications system, the area covered by the telecommunications network being divided into a number of sub-areas;
    means for maintaining information indicating on which sub-areas the subscribers have ordered information, said information being sub-area-specific information;
    means for maintaining information indicating to which sub-area the subscriber terminals of said subscribers are connected at a given time;
    means for maintaining information indicating the correspondence between each node and each sub-area;
    means for determining on the basis of said information via which nodes said sub-area-specific information is to be transmitted; and
    means for transmitting, in response to a trigger event, sub-area specific information to the subscribers via nodes of the telecommunications network.

* * * * *